United States Patent
Ranjbar et al.

(10) Patent No.: US 11,502,944 B2
(45) Date of Patent: Nov. 15, 2022

(54) CONFIGURING A NETWORK PATH IN AN SDN

(71) Applicant: Telefonaktiebolaget LM Ericsson (publ), Stockholm (SE)

(72) Inventors: Alireza Ranjbar, Espoo (FI); Patrik Salmela, Espoo (FI); Miika Komu, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 37 days.

(21) Appl. No.: 17/058,202

(22) PCT Filed: Jun. 7, 2018

(86) PCT No.: PCT/SE2018/050591
§ 371 (c)(1),
(2) Date: Nov. 24, 2020

(87) PCT Pub. No.: WO2019/235982
PCT Pub. Date: Dec. 12, 2019

(65) Prior Publication Data
US 2021/0184964 A1    Jun. 17, 2021

(51) Int. Cl.
*H04L 61/103* (2022.01)
*H04L 45/302* (2022.01)
(Continued)

(52) U.S. Cl.
CPC ............ *H04L 45/302* (2013.01); *H04L 45/02* (2013.01); *H04L 45/64* (2013.01); *H04L 61/103* (2013.01)

(58) Field of Classification Search
None
See application file for complete search history.

(56) References Cited

U.S. PATENT DOCUMENTS

2007/0036161 A1    2/2007    Muhamuni
2007/0201490 A1    8/2007    Muhamuni
(Continued)

FOREIGN PATENT DOCUMENTS

CN    101414956 A    4/2009
CN    104115453 A    10/2014
(Continued)

OTHER PUBLICATIONS

Ethernet MAC Chaining by P. Bottorff et al.; Network Working Group; Internet Draft; Intended Status: Informational; Expires: Jan. 2017-Jul. 21, 2016.
(Continued)

*Primary Examiner* — Jenkey Van
(74) *Attorney, Agent, or Firm* — Baker Botts, LLP

(57) ABSTRACT

It is presented a method for configuring a network path. The method is performed in a routing control device of a software defined network and comprises the steps of: receiving a first node packet originating from a first node of the software defined network, the first node packet forming part of an ARP exchange between an ARP requester and an ARP responder, the first node packet comprising a request for network properties encoded in a first address; determining a network path through the software defined network; changing a source address of a packet to the ARP requester to be a second address; configuring all switches forming part of the network path, to route packets in accordance with the network path; and configuring an edge switch to replace, for all packets having a destination address being equal to the second address, the destination address with an address of the ARP responder.

14 Claims, 4 Drawing Sheets

(51) Int. Cl.
*H04L 45/02* (2022.01)
*H04L 45/64* (2022.01)

(56) References Cited

U.S. PATENT DOCUMENTS

| | | | | |
|---|---|---|---|---|
| 2015/0043335 | A1* | 2/2015 | Testicioglu | H04L 47/628 370/230 |
| 2015/0089032 | A1* | 3/2015 | Agarwal | H04L 41/0873 709/221 |

FOREIGN PATENT DOCUMENTS

| | | |
|---|---|---|
| CN | 104518993 A | 4/2015 |
| CN | 104702502 A | 6/2015 |
| CN | 105144652 A | 12/2015 |
| CN | 105393492 A | 3/2016 |
| CN | 105594166 A | 5/2016 |
| CN | 106211255 A | 12/2016 |
| CN | 106803803 A | 6/2017 |
| CN | 107547242 A | 1/2018 |
| EP | 2 787 698 A2 | 10/2014 |

OTHER PUBLICATIONS

Domain Isolation in a Multi-Tenant Software-Defined Network by Alireza Ranjbar et al.; ACM 8th International Conference on Utility and Cloud Computing, IEEE—2015.

PCT International Search Report issued for International application No. PCT/SE2018/050591—dated Feb. 5, 2019.

PCT Written Opinion of the International Searching Authority issued for International application No. PCT/SE2018/050591—dated Feb. 5, 2019.

Improving SDN With Inspired Switches by Roberto Bifulco et al.; NEC Laboratories Europe—2016.

OpenFlow Switch Specification version 1.3.1 (Wire Protocol 0×04)—Sep. 6, 2012.

Path Aware, Networking PRG by Brian Trammell and Jen Linkova, IETF 99—Prague—Jul. 29, 2017.

Shadow MACS: Scalable Label-Switching for Commodity Ethernet by Kanak Agarwal et al.—Aug. 22, 2014.

Chinese Office Action issued for Application No. 201880094234.3—dated Jan. 27, 2022.

Mark Matties, Distributed Responder ARP: Using SDN to Re-Engineer ARP from within the Network, 2017 Workshop on Computing, Networking and Communications (CNC)—IEEE 2017.

Roberto Bifulco et al., Improving SDN with InSPired Switches, NEC Laboratories Europe, SOSR '16 Mar. 14-15, 2016, Santa Clara, CA, USA—2016.

Master Thesis: Research on Key Routing Technologies in Hybrid SDN Environment by Wang Chang; University of Electronic Science and Technology of China—May 12, 2014.

Chinese Notice of Allowance issued for Application No. 201880094234.3—dated Jun. 6, 2022.

* cited by examiner

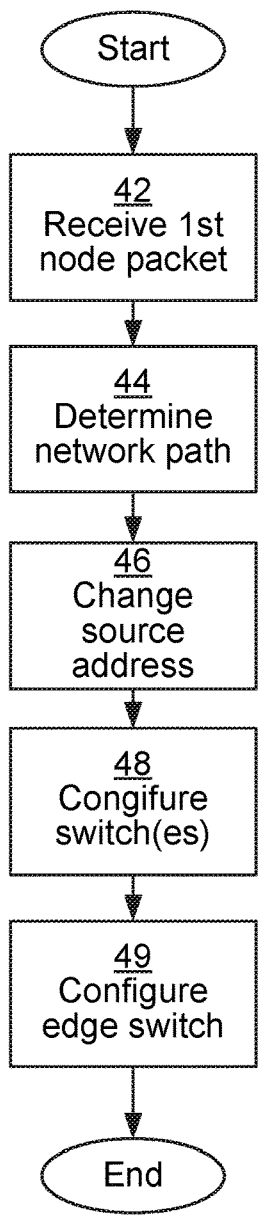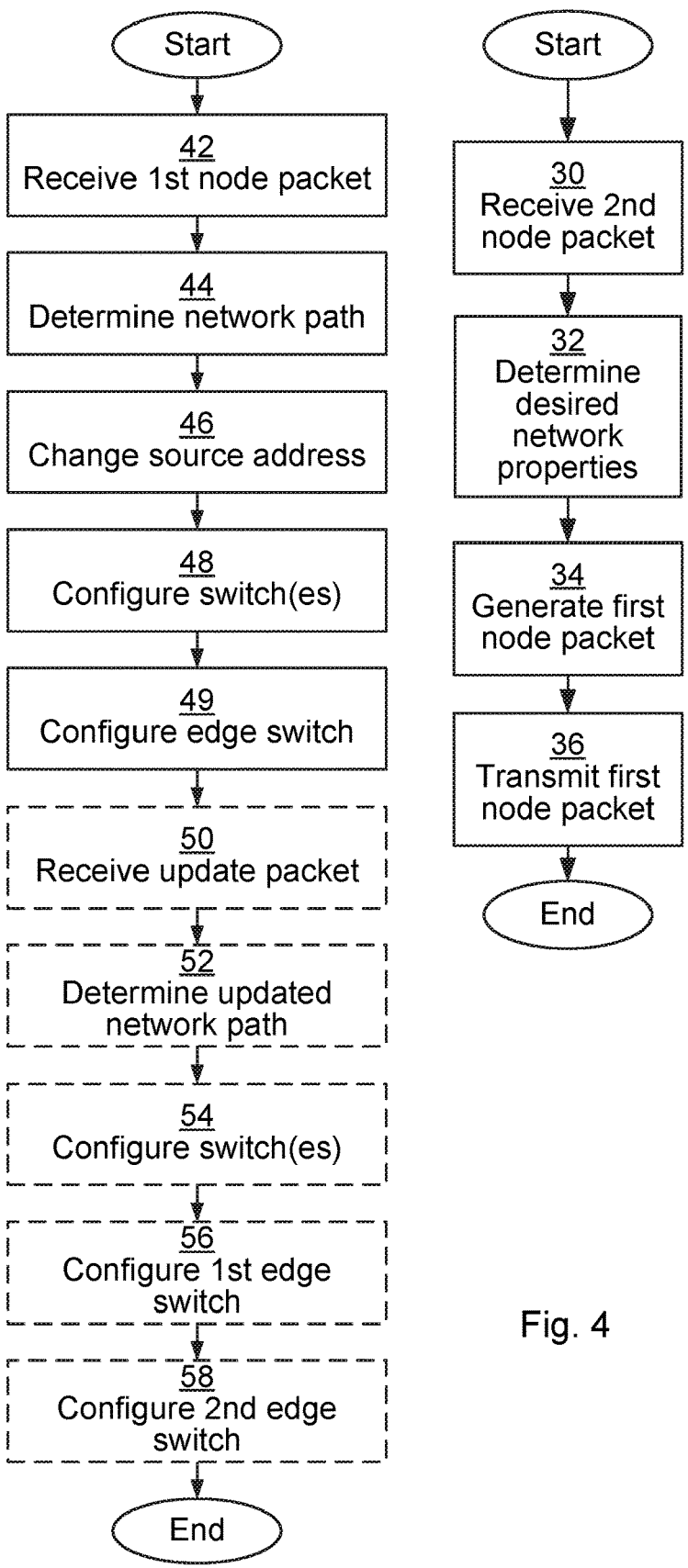
Fig. 3A
Fig. 3B
Fig. 4

CONFIGURING A NETWORK PATH IN AN SDN

PRIORITY

This nonprovisional application is a U.S. National Stage Filing under 35 U.S.C. § 371 of International Patent Application Serial No. PCT/SE2018/050591 filed Jun. 7, 2018 and entitled "CONFIGURING A NETWORK PATH IN AN SDN" which is hereby incorporated by reference in its entirety.

TECHNICAL FIELD

The invention relates to methods, routing control devices, computer programs and computer program products for configuring a network path in a software defined network (SDN).

BACKGROUND

Routers and switches use packet headers to route the data flows in a network. The switches often rely on MAC (Media Access Control) addresses and routers use IP addresses to forward and route the data flows between two end hosts in a network. In addition, labelling and tunnelling techniques can be used to route the data flows. VLAN (Virtual Local Area Network) is the most well-known example of labelling and tunnelling technology in which the switches tag the data flows with a VLAN ID and forward the data flows based on the VLAN identifier. More sophisticated techniques have also been developed to extend the tunnelling techniques to large scale networks.

The advent of software defined networks (SDN) has improved network forwarding operations by creating more control over the data flows. In an SDN, the switches often forward new flows to a routing control device which then decides how to forward the flows by instructing the switches (e.g. using OpenFlow protocol) to thereby control routing of the data flows. SDN technology enhances the forwarding operations and allows administrators to assign customised labels, changes to the packet headers and routing of data flows in a centralised way.

A problem with the available technologies is that host and network selection of the "best path" may have conflicts, and often the network is unaware of the requirements of applications running on end hosts. As an example, the server may run a latency sensitive service. However, the network does not know about the requirements of services running on the end host and it may not choose the path with lowest latency for this service.

To tackle this problem, a set of network APIs (Application Programming Interfaces) have been suggested for SDNs, to provide access to the routing control device. The APIs allow the routing control device to gain better information to be able to define an improved path per flow in the network. However, this approach is impractical and introduces a security risk for SDN operators by providing API access for end hosts to the routing control device.

SUMMARY

It is an object to provide an improved way to allow end hosts to request network properties for their communication.

According to a first aspect, it is presented a method for configuring a network path. The method is performed in a routing control device of a software defined network and comprises the steps of: receiving a first node packet originating from a first node of the software defined network, the first node packet forming part of an ARP, Address Resolution Protocol, exchange between an ARP requester and an ARP responder, the first node packet comprising a request for network properties, the request being encoded in a first address, being a source address, of the first node packet; determining a network path through the software defined network between the first node and a second node based on the request for network properties, the network path being identified by a second address; changing a source address of a packet to the ARP requester to be the second address; configuring all switches forming part of the network path, to route packets in accordance with the network path for packets comprising a destination address equal to the second address; and configuring an edge switch, being a switch closest to the ARP responder, to replace, for all packets having a destination address being equal to the second address, the destination address with an address of the ARP responder.

All addresses may be Medium Access Control, MAC, addresses.

The first node may be the ARP responder, the second node may be the ARP requester, and the first node packet may be an ARP response. In such a case, in the step of changing the source address, the packet to the ARP requester is the first node packet.

The first node may be the ARP requester, the second node may be the ARP responder, and the first node packet is an ARP request. In such a case, in the step of changing the source address, the packet to the ARP requester is an ARP response corresponding to the ARP request.

The network properties may comprise any one or more of: bandwidth, latency, network slice and one or more service nodes to pass.

The method may further comprise the steps of: receiving an update packet originating from the first node of the software defined network, the update packet comprising an updated request for updated network properties, the request being encoded in a source address, of the update packet; determining an updated network path through the software defined network between the first node and a second node based on the request for updated network properties, the updated network path being identified by a third address; configuring all switches forming part of the updated network path, to route packets in accordance with the updated network path for packets comprising a destination address equal to the third address; configuring an edge switch, being a switch closest to the first node, to replace, for all packets having a destination address being equal to be the second address, the destination address with a destination address being the third address; and configuring an edge switch, being a switch closest to the second node, to replace, for all packets having a destination address being equal to the third address, the destination address with a destination address being the address of the second node.

According to a second aspect, it is presented a routing control device for configuring a network path, the routing control device being configured to form part of a software defined network. The routing control device comprises: a processor; and a memory storing instructions that, when executed by the processor, cause the routing control device to: receive a first node packet originating from a first node of the software defined network, the first node packet forming part of an ARP, Address Resolution Protocol, exchange between an ARP requester and an ARP responder, the first node packet comprising a request for network properties, the request being encoded in a first address, being a source address, of the first node packet; determine a network path through the software defined network between the first node and a second node based on the request for network properties, the network path being identified by a second address; change a source address of a packet to the ARP requester to be the second address; configure all switches forming part of the network path, to route packets in accordance with the network path for packets comprising a destination address equal to the second address; and configure an edge switch, being a switch closest to the ARP responder, to replace, for all packets having a destination address being equal to the second address, the destination address with an address of the ARP responder.

All addresses may be Medium Access Control, MAC, addresses.

The first node may be the ARP responder, the second node may be the ARP requester, and the first node packet may be an ARP response. In such a case, the packet to the ARP requester is the first node packet.

The first node may be the ARP requester, the second node may be the ARP responder, and the first node packet may be an ARP request. In such a case, the packet to the ARP requester is an ARP response corresponding to the ARP request.

The network properties may comprise any one or more of: bandwidth, latency, network slice and one or more service nodes to pass.

The routing control device may further comprise instructions that, when executed by the processor, cause the routing control device to: receive an update packet originating from the first node of the software defined network, the update packet comprising an updated request for updated network properties, the request being encoded in a source address, of the update packet; determine an updated network path through the software defined network between the first node and a second node based on the request for updated network properties, the updated network path being identified by a third address; configure all switches forming part of the updated network path, to route packets in accordance with the updated network path for packets comprising a destination address equal to the third address; configure an edge switch, being a switch closest to the first node, to replace, for all packets having a destination address being equal to the second address, the destination address with a destination address being the third address; and configure an edge switch, being a switch closest to the second node, to replace, for all packets having a destination address being equal to the third address, the destination address with a destination address being the address of the second node.

According to a third aspect, it is presented a routing control device comprising: means for receiving a first node packet originating from a first node of a software defined network of which the routing control device is part of, the first node packet forming part of an ARP, Address Resolution Protocol, exchange between an ARP requester and an ARP responder, the first node packet comprising a request for network properties, the request being encoded in a first address, being a source address, of the first node packet; means for determining a network path through the software defined network between the first node and a second node based on the request for network properties, the network path being identified by a second address; means for changing a source address of a packet to the ARP requester to be the second address; means for configuring all switches forming part of the network path, to route packets in accordance with the network path for packets comprising a destination address equal to the second address; and means for configuring an edge switch, being a switch closest to the ARP responder, to replace, for all packets having a destination address being equal to the second address, the destination address with an address of the ARP responder.

According to a fourth aspect, it is presented a computer program configuring a network path. The computer program comprises computer program code which, when run on a routing control device of a software defined network, causes the routing control device to: receive a first node packet originating from a first node of the software defined network, the first node packet forming part of an ARP, Address Resolution Protocol, exchange between an ARP requester and an ARP responder, the first node packet comprising a request for network properties, the request being encoded in a first address, being a source address, of the first node packet; determine a network path through the software defined network between the first node and a second node based on the request for network properties, the network path being identified by a second address; change a source address of a packet to the ARP requester to be the second address; configure all switches forming part of the network path, to route packets in accordance with the network path for packets comprising a destination address equal to the second address; and configure an edge switch, being a switch closest to the ARP responder, to replace, for all packets having a destination address being equal to the second address, the destination address with an address of the ARP responder.

According to a firth aspect, it is presented a computer program product comprising a computer program according to the fourth aspect and a computer readable means on which the computer program is stored.

According to a sixth aspect, it is presented a method for configuring a network path. The method is performed in an ARP, Address Resolution Protocol, responder of a software defined network and comprises the steps of: receiving a second node packet comprising an ARP request for the ARP responder, the second node packet originating from a second node and the second node packet forming part of an ARP exchange between an ARP requester and the ARP responder; determining desired network properties of a network path; generating a first node packet comprising a request for the desired network properties, wherein the request is encoded in a first address, being a source address, of the first node packet; and transmitting the first node packet.

The second node may be the ARP requester.

The network properties may comprise any one or more of: bandwidth, latency, network slice and one or more service nodes to pass.

According to a seventh aspect, it is presented an ARP, Address Resolution Protocol, responder for configuring a network path, the ARP responder being configured to form part of a software defined network. The ARP responder comprises: a processor; and a memory storing instructions that, when executed by the processor, cause the ARP responder to: receive a second node packet comprising an ARP request for the ARP responder, the second node packet originating from a second node and the second node packet forming part of an ARP exchange between an ARP requester and the ARP responder; determine desired network properties of a network path; generate a first node packet comprising a request for the desired network properties, wherein the request is encoded in a first address, being a source address, of the first node packet; and transmit the first node packet.

The second node may be the ARP requester.

The network properties may comprise any one or more of: bandwidth, latency, network slice and one or more service nodes to pass.

According to an eighth aspect, it is presented an ARP, Address Resolution Protocol, responder comprising: means for receiving a second node packet comprising an ARP request for the first node, the second node packet originating from a second node and the second node packet forming part of an ARP exchange between an ARP requester and the ARP responder used in a software defined network; means for determining desired network properties of a network path; means for generating a first node packet comprising a request for the desired network properties, wherein the request is encoded in a first address, being a source address, of the first node packet; and means for transmitting the first node packet.

According to a ninth aspect, it is presented a computer program for configuring a network path. The computer program comprises computer program code which, when run on an ARP, Address Resolution Protocol, responder forming part of a software defined network causes the ARP responder to: receive a second node packet comprising an ARP request for the ARP responder, the second node packet originating from a second node and the second node packet forming part of an ARP, Address Resolution Protocol, exchange between an ARP requester and the ARP responder; determine desired network properties of a network path; generate a first node packet comprising a request for the desired network properties, wherein the request is encoded in a first address, being a source address, of the first node packet; and transmit the first node packet.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 3A-B are flow charts illustrating methods for configuring a network path;

FIG. 4 is a flow chart illustrating methods for configuring a network path;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
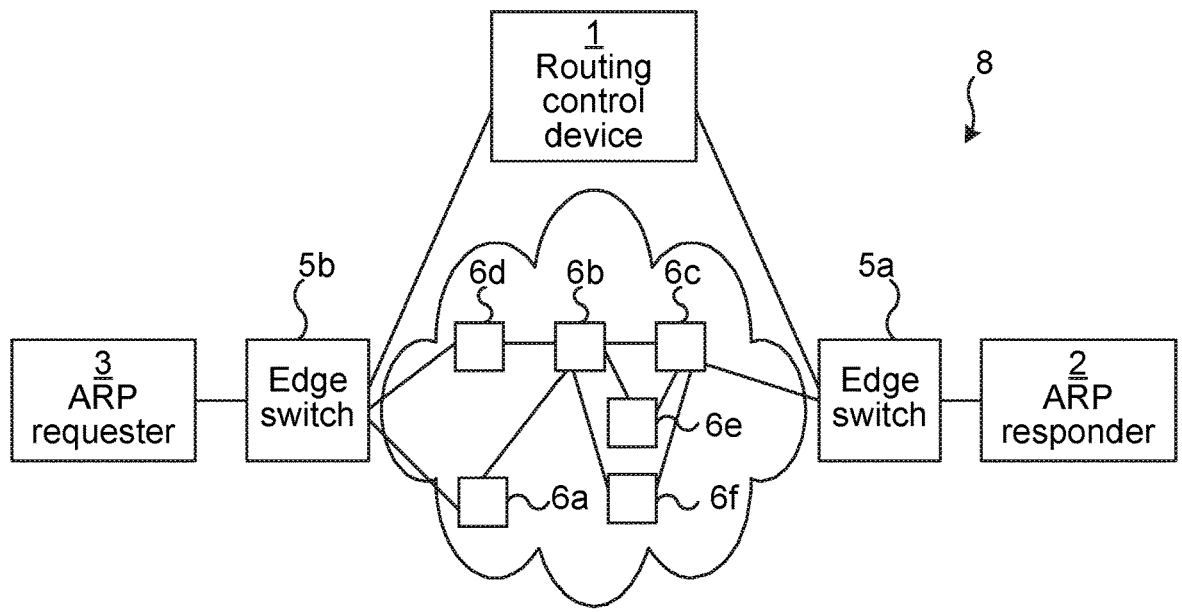
FIG. 1 is a schematic diagram illustrating a Software Defined Network (SDN) 8 where embodiments presented herein may be applied.

FIG. 1 is a schematic diagram illustrating a Software Defined Network (SDN) 8 where embodiments presented herein may be applied.

In this example, there are two end nodes 2, 3. For purposes herein, the two end nodes are termed according to their roles when ARP (Address Resolution Protocol) commences. ARP is used to obtain a link layer address (e.g. a MAC address) corresponding to a network layer address (e.g. IP (Internet Protocol) address). Specifically, there is one end node that is termed an ARP requester 3 and another end node that is termed an ARP responder 2. The ARP requester 3 is the end node that initiates the ARP resolution between the two nodes and is first to transmit an ARP request and the ARP responder 2 is the end node that first transmits an ARP response. It is to be noted that, at later stages, the ARP responder 2 is likely to, but does not need to, transmit an ARP request and the ARP requester 3 is likely to transmit an ARP response.

Each one of the end nodes 2, 3 can be an end host or a gateway to another network. The ARP requester 3 can be a client and the ARP responder 2 can be a server or vice versa. Moreover, both the ARP requester 3 and the ARP responder 2 can be servers and/or form part of peer to peer (P2P) communication. Even though two end nodes are shown here, there may be any suitable number of end nodes in the SDN 8. A switch which is closest to the ARP responder 2 is a first edge switch 5a. A switch which is closest to the ARP requester 3 is a second edge switch 5b. Between the edge switches 5a, 5b, there are several core switches 6a-6f, in this example six core switches 6a-6f. There can be many different routes between the edge switches 5a-b within the SDN. The routing through the SDN can be controlled by a routing control device 1, also known as an SDN controller.

The routing control device 1 instructs all switches (both edge switches 5a-b and core switches 6a-f) using e.g. the OpenFlow protocol. Embodiments presented herein are compatible with any known version of the OpenFlow protocol. Based on the OpenFlow specifications, both edge switches 5a-b, or in fact any switches, should be able to direct new flows to the routing control device 1 for it to decide about how to handle the flow (using packet-in messages in OpenFlow). After receiving a new flow request from a switch, the routing control device 1 can instruct all switches in the network that are involved in the path of the flow by installing forwarding rules (using flow-mod messages in OpenFlow) on the selected path.

According to embodiments presented herein, the ARP requester 3 or the ARP responder 2 can request a set of requirements for its flows from the routing control device 1 and it communicates these requirements by embedding the details in its MAC address. This is easy to configure since many of today's services run on virtual machines and changing the MAC address is simple to implement. The modified MAC address is encoded to indicate a set of one or more requirements that are requested. These requirements are embedded in a format that is understandable for the routing control device 1. The requirements can relate to any one or more of bandwidth, latency, network slice and one or more service nodes to pass. Service nodes can e.g. relate to deep packet inspection, caching, billing, serving web content, proxying web traffic, etc.

The end node (ARP requester 3 or ARP responder 2) sends its MAC address to the routing control device 1 in ARP (Address Resolution Protocol) requests, ARP replies or in flow signals, e.g. TCP (Transport Control Protocol) SYN-ACK signals.

Figure 2A:
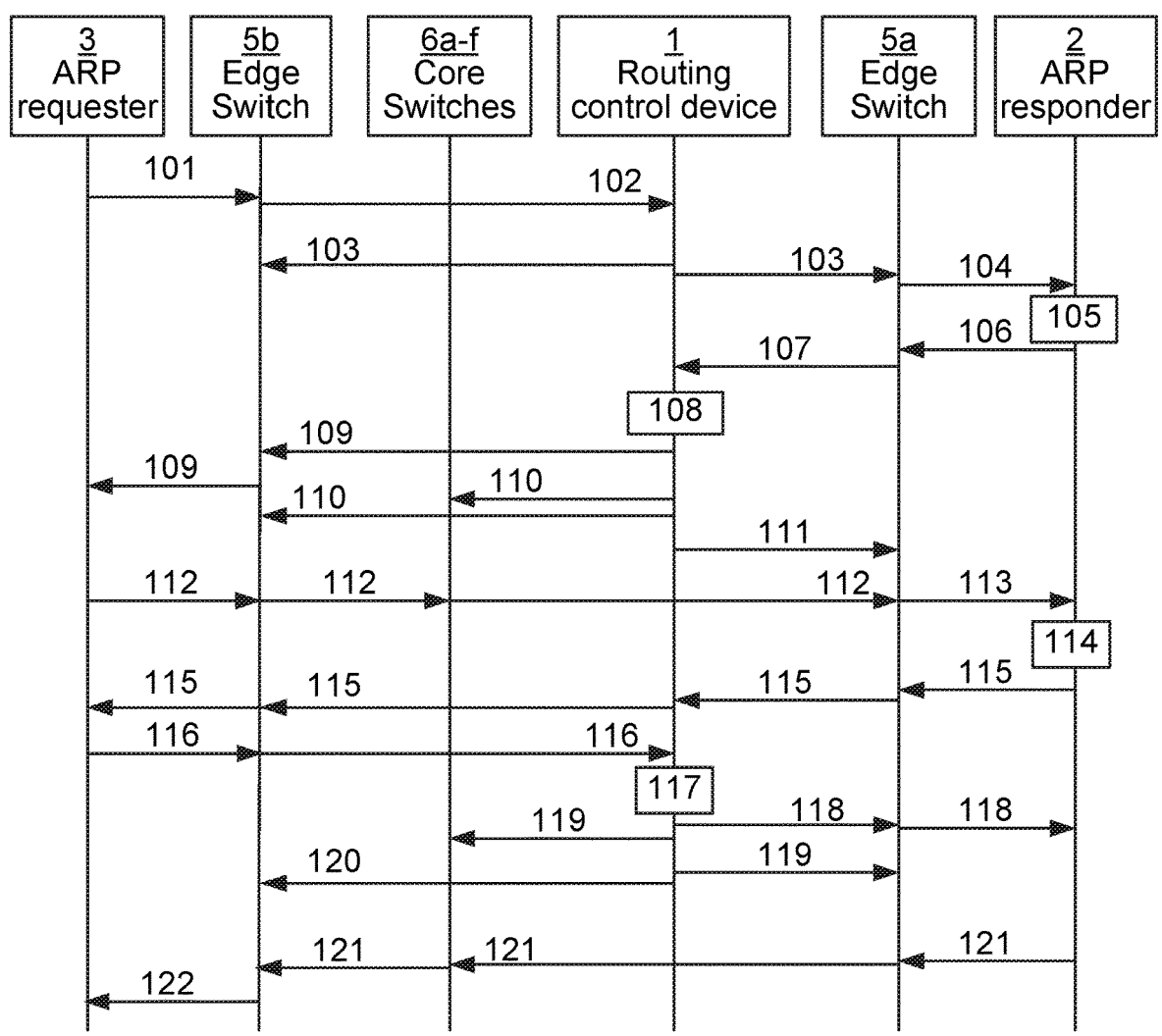
FIGS. 2A-B are sequence diagrams illustrating communication between different entities of a SDN, such as the SDN of FIG. 1.
Figure 2B:
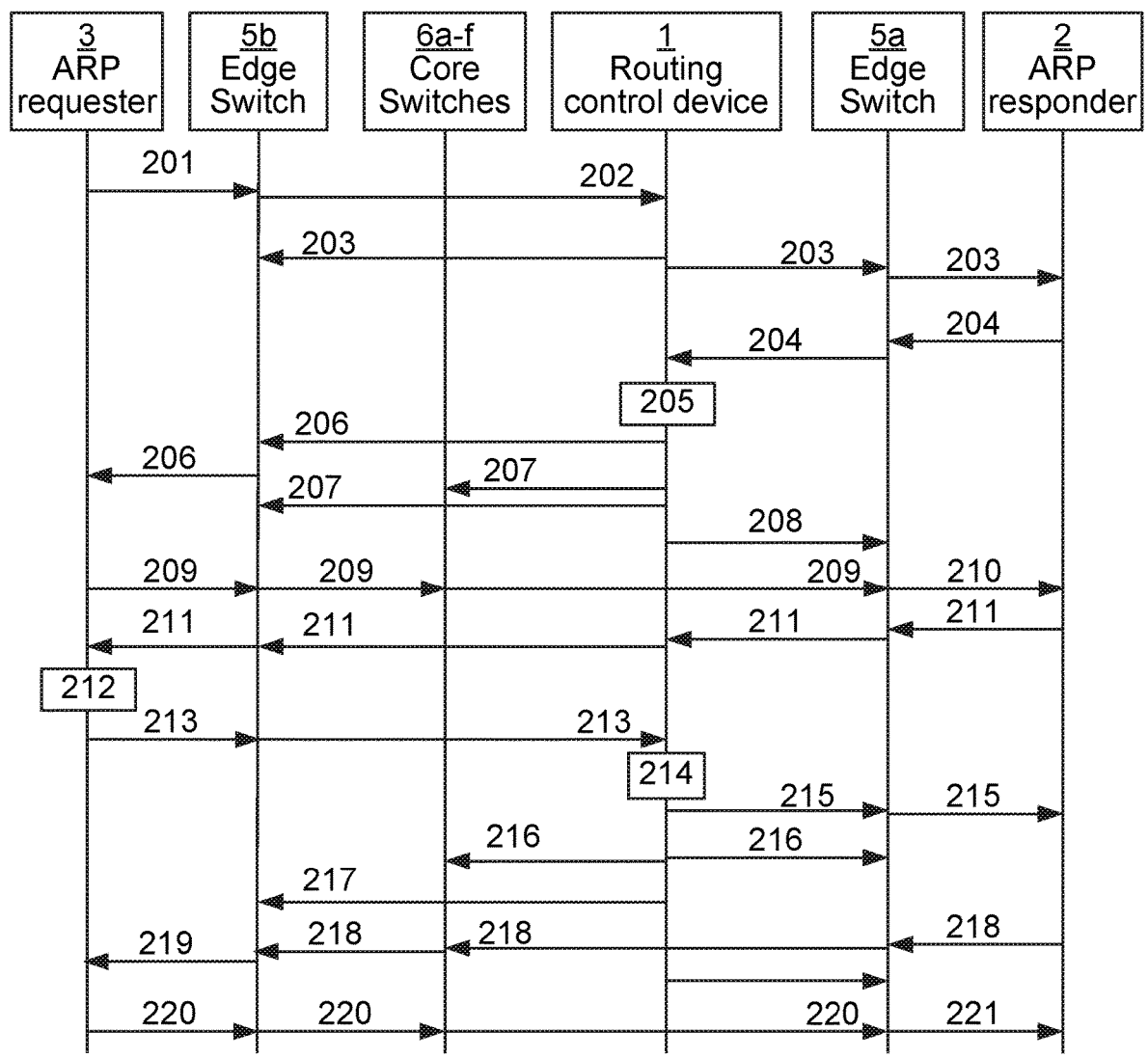

FIGS. 2A-B are sequence diagrams illustrating communication between different entities of a software defined network, such as the network of FIG. 1. Looking first to FIG. 2A, a situation is shown where the ARP responder 2 requests certain network properties.

The first step for the ARP requester 3 to connect to the ARP responder 2 in the SDN network is to send an ARP request 101. The ARP requester 3 can be a client, a gateway or even a server in another context.

In the OpenFlow protocol, for every new flow, the switches can transmit the first packet of flow to the routing control device 1 to decide about it. Since it is a new ARP request, i.e. flow, the second edge switch 5b directs OpenFlow Packet-in messages (including the ARP request) 102 to the routing control device 1.

The routing control device 1 receives the new request 102 and sends the request 103 to all edge switches 5a, 5b to flood the ARP request out of all switch ports.

The first switch 5a floods the ARP request 104 on all its ports.

After the ARP responder 2 has received the ARP request 104 from the first edge switch 5a, the ARP responder 2 determines 105 what network properties to request and embeds the properties in its MAC address.

The ARP responder 2 sends an ARP response 106 with the modified MAC address as the source address. The ARP responder 2 can e.g. be a server or a gateway. The ARP responder 2 is called so since it is the first node to send the ARP response 106.

The first edge switch 5a receives the new ARP response 106 and, since it is a new response, the first edge switch 5a forwards this response 107 to the routing control device 1 to decide about it (packet-in message)

The routing control device 1 receives ARP response 107 and processes 108 the ARP response 107. The routing control device 1 checks the source MAC address (set by the ARP responder 2) in the response message 107. The routing control device decodes the requested network properties from the ARP responder 2 for inbound flows from the MAC address. Depending on the requested properties from the ARP responder 2 and availability of network resources, the routing control device 1 determines an appropriate path (path 1) and sets a new MAC address (MAC_path1), replacing the MAC address of the ARP responder 2 with the new MAC address for inbound flows to the ARP responder 2. While it is possible to use the MAC address of the ARP responder 2, the routing control device 1 may select a new MAC address (MAC_path1) depending on the topology of the network or for aggregating several flows.

The routing control device 1 then sends the ARP response 109 (including MAC_path1 as the source address) to the second edge switch 5b which then forwards the ARP response message 109 to the ARP requester 3.

In addition, the routing control device 1 installs no forwarding rules on the second edge switch 5b and other switches in path 1 at the core network to route the flows with destination MAC address equal to MAC_path1 in the network. This helps to route all flows destined to the ARP responder 2 in a specific path (based on the determined network path based on the network properties requested by the ARP responder 2).

The routing control device 1 also installs 111 a rule on the first edge switch 5a connected to the ARP responder 2, to change the MAC address of all flows destined to the MAC_path1 to the MAC address of the ARP responder 2 (MAC_responder). As a result, the ARP responder 2 can accept all flows with its own MAC address. In one embodiment, the ARP response includes the modified MAC address including requested network properties in the ARP header/message, and the MAC address of the ARP responder (MAC_responder) in the MAC/Ethernet header (or vice versa). In this way, the ARP requester would only use the modified MAC address for signalling requirements, but traffic would be received using MAC_responder, based on translation rules installed to the closest GW by controller. The use of different MAC addresses in the Ethernet header and the ARP header could also be a way of indicating to the routing control device 1 that the solution of embodiments presented herein is applied.

When the ARP requester 3 sends a data flow 112 with the destination MAC address equal to MAC_path1, the second edge switch 5b and all core switches 6a-f in path 1 forwards the data flow in accordance with MAC_path1.

When a data flow with destination MAC address of MAC_path1 arrives at the first edge switch 5a, the switch changes the destination MAC address to MAC_responder and forwards the flow 113 to the ARP responder 2.

The ARP responder 2 and ARP requester 3 have separate ARP resolution processes. Before any communication from ARP responder 2 to ARP requester 3, the ARP responder 2 could also send ARP request and gain the MAC address of the ARP requester 3. Alternatively, the ARP responder could store MAC/IP mapping from all received ARP requests in which case the reverse lookup would not be needed. Nevertheless, the process for the ARP responder initiating its own ARP resolution process will now be described for completeness. We use this step to indicate the requirements of the ARP responder 2 for outbound flow. In this step, the ARP responder 2 embeds 114 its requirements in its MAC address and sends the ARP request 115 to the ARP requester 3. The new MAC address is not necessarily a new physical address but it is only a customized MAC address for indication of requirements to the routing control device 1, as explained in more detail below with reference to FIG. 3A.

Similar to what is described above, the routing control device 1 receives the ARP request 115 and broadcasts it to the network. Moreover, the routing control device can record the requirements and MAC address used in the ARP request 115. This could be particularly useful if there are different MAC addresses in the Ethernet header and the ARP header, since it might not be possible to know if the address will be modified or directly copied when ARP reply to the ARP request is generated. It should be also noted here that this step can be omitted if the routing control device 1 already has recorded the MAC address of ARP requester 3 from before so then it can respond to the ARP request 115 by itself. However, when applying our solution also for ARP requester 3 communication, having the ARP request go to the ARP requester 3 is needed when we want to have path requirements set before actual communication commences. The ARP requester 3 can also change path requirements later with some other protocol than ARP, e.g. with a payload message.

The ARP requester 3 receives the ARP request 115 and sends an ARP response 116, including its own MAC address, which is then forwarded to the routing control device 1.

The routing control device 1 receives the ARP response 116 and generates 117 a new path, path 2, which results in a new MAC address, MAC_path2, based on the requirements of the ARP responder 2 for outbound flows to the specific ARP requester 3.

The routing control device 1 then sends the ARP response 118 with MAC_path2 as the MAC address of the ARP requester 3 to the ARP responder 2.

The routing control device 1 installs 119 rules on the first edge switch 5*a* and involved core switches to forward all flows destined to MAC_path2 to go through the path fulfilling the requirements of the ARP responder 2 for outbound flows towards the ARP requester 3.

The routing control device 1 also installs 120 rules on the second edge switch 5*b* to translate all flows with destination MAC_path2 to the MAC address for the ARP requester 3, MAC_requester.

The ARP responder 2 is now able to send all outbound traffic 121 to MAC_path2 which is then forwarded to the second edge switch 5*b* along path 2.

The second edge switch 5*b* changes the destination address of all flows with destination MAC_path2 to MAC_requester, and forwards 122 to the ARP requester 3.

Looking now to FIG. 2B, this is similar to the situation illustrated in FIG. 2A, but where it is the ARP requester that requests certain network properties.

The first step for the ARP requester 3 to connect to the ARP responder 2 in the SDN network is to send an ARP request 201. The ARP requester 3 can be a client, a gateway or even a server in another context. The ARP requester 3 embeds its requirements for network properties outbound flows in its own MAC address and sends the ARP request 201.

In the OpenFlow protocol, for every new flow, the switches can transmit the first packet of flow to the routing control device 1 to decide about it. Since it is new ARP request, i.e. flow, the second edge switch 5*b* transmits OpenFlow Packet-in messages (including the ARP request) 202 to the routing control device 1. The routing control device 1 decodes the requirements and allocates a suitable path, identified by its own MAC address, MAC_path3.

The routing control device 1 receives the new request 202 and subsequently, it sends the request 203 to all edge switches 5*a*, 5*b* to flood the ARP request out of all switch ports.

The ARP responder 2 receives the ARP request from the first edge switch 5*a* and sends an ARP reply 204.

The routing control device 1 translates 205 the MAC address of the ARP responder 2 to MAC_path3 and sends ARP reply 206 (via the second edge switch 5*b*) to the ARP requester 3 with MAC_path3.

The second edge switch 5*b* forwards the ARP reply 206 with MAC_path3 to the ARP requester 3.

The routing control device 1 installs 207 rules on involved core switches 6*a-f* and the second edge switch 5*b* to forward all flows with destination MAC_path3 through path fulfilling requirements of the ARP requester 3.

The routing control device 1 installs 208 rules on the first edge switch 5*a* to change the destination MAC address of all outbound flows with MAC_path3 to MAC_responder.

The ARP requester 3 sends all flows 209 to the ARP responder 2 with destination MAC_path3 which is then forwarded by the second edge switch 5*b* and involved core switches 6*a-f* in the network.

The first edge switch 5*a* changes the MAC address of all outbound flows from MAC_path3 to MAC_responder and forwards them 210 to the ARP responder 2.

The ARP responder 2 and the ARP requester 3 have separate ARP resolution processes. Before any outbound communication, the ARP responder 2 may also send an ARP request 211 and gain the MAC address of the ARP requester 3. The ARP responder 2 sends the ARP request 211 to the ARP requester 3 which is forwarded through the routing control device 1.

The ARP requester 3 receives the ARP request and embeds 212 its network property requirements for inbound flows and responds with a new customized MAC address. The new MAC address of the ARP requester 3 is not necessarily a new physical MAC address but could be a virtual MAC address to indicate to the routing control device 1 the requirements.

The ARP reply 213 from the ARP requester 3 is then forwarded to the routing control device 1 by the second edge switch 5*b*.

The routing control device 1 receives the ARP reply 213 and processes 214 the requests embedded in the MAC address. The routing control device 1 generates a new MAC_path2 based on the requirements of the ARP requester 3 for inbound flows.

The routing control device 1 sends the ARP reply 215, with MAC_path2 as the MAC address of the ARP requester 3, to the ARP responder 2.

The routing control device 1 then installs 216 rules on the first edge switch 5*a* and involved core switches 6*a-f* to forward all flows destined to MAC_path2

The routing control device 1 also installs 217 rules on the second edge switch 5*b* to translate all flows with destination MAC_path2 to MAC_requester.

The ARP responder 2 is now able to send all traffic 218 to the ARP requester 3 using MAC_path2 which is then forwarded to the second edge switch 5*b*.

The second edge switch 5*b* also rewrites all flows with destination MAC_path2 to MAC_requester so then the ARP requester 3 is able to accept the flows 219.

The ARP requester 3 can also send flows 220 with MAC_path 3 towards the ARP responder 2 which is then forwarded in the network by the second edge switch 5*b* and involved core switches 6*a-f*.

When the first edge switch 5*a* receives flows with destination MAC equal to MAC_path3, it rewrites the header to MAC_responder and forwards it 221 to the ARP responder 2.

FIGS. 3A-B are flow charts illustrating methods for configuring a network path. The methods are performed in a routing control device of an SDN, such as the SDN of FIG. 1. The illustrated methods correspond to the actions of the routing control device 1 illustrated in FIGS. 2A-B and described above. First, the steps of the flow chart of FIG. 3A will be described.

In a receive 1$^{st}$ node packet step 42, the routing control device receives a first node packet originating from a first node of the software defined network. The first node packet forms part of an ARP exchange between an ARP requester and an ARP responder. The first node packet comprises a request for network properties, wherein the request is encoded in a first address, e.g. MAC address, of the first node packet. The first address is a source address of the first node packet.

The network properties may comprise any one or more of: bandwidth, latency, network slice and one or more service nodes to pass.

MAC addresses can either be universally administered addresses (UAA) or locally administered addresses (LAA). A universally administered address is uniquely assigned to a device by its manufacturer. The first three octets (in transmission order) identify the organization that issued the identifier and are known as the organizationally unique identifier (OUI). Universally administered and locally administered addresses are distinguished by setting the second-least significant bit of the first octet of the address. This bit is also referred to as the U/L bit, short for Universal/Local, which identifies how the address is administered. If the bit is 0, the address is universally administered. To convert a MAC-48 (48-bit MAC) into a 64-bit MAC, the OUI is copied, the two octets FF-FF are appended and then the organization-specified extension identifier is copied. To convert an EUI-48 (another 48-bit MAC format) into an EUI-64, the same process is used, but the sequence inserted is FF-FE.

The infrastructure owner is typically also the administrator/owner of the routing control device. The physical hosts could have UAA MACs while virtual machines would typically have LAA MACs.

As the infrastructure owner knows the MACs in its network, the owner can find a 6-bit prefix of the OUI that is not used by any of its (physical) NICs (Network Interface Controllers) and select that prefix as an identifier for MACs using the solution of embodiments presented herein. Then the OUI would start with that 6-bit prefix, followed by the U/L bit (could be either 0 or 1, if different entity assigning LAAs to virtual machines, then using '0' would at least protect against accidental MAC assignments in allocated address space) and then the multicast bit. The rest (16 bits) of the OUI could then be used for giving the requirements.

If the same entity controls everything, the prefix identifying the use of the solution presented herein should be selected to not interfere with any of the MACs (LAAs and UAAs) used in the network, and then the U/L bit could be either 0 or 1. In one embodiment, the U/L set to '1', since '0' implies that the prefix is allocated to some identified entity.

Another option is to use 64-bit MACs, which are constructed from 48-bit MACs by adding a 16-bit field (FFFF or FFFE) between OUI and the NIC identifier. Then the additional 16-bit part can be used to indicate the use of the solution presented herein, e.g. replacing FFFF with AAAA. In this case even more bits could be used for giving requirements (all except the U/L bit and the multicast bit, so 22 bits). The number of bits available to for indicating requirements could be extended by using part of the "padding" used for generating 64-bit MACs or using part of the NIC ID bits.

Requirements could be indicated in the following way in the 16-22 bits available. 1-bit indicators for indicating the requirement to use: NAT (Network Address Translation), firewall (FW), DPI, cache, IPv6. Multiple bit indicators giving e.g. bandwidth or latency requirement, e.g. 2 bits, giving a scale of 0-3

One example of encoding is presented here:
48-bit MAC: <octet 1><octet 2><octet 3><octet 4><octet 5><octet 6>
Octet 1: [6-bits identifying our solution is being used] [U/L bit, (e.g.) set to 0] [multicast bit]
Octets 2-3: fixed for giving requirements, either true(1)/false (0) or scale/number values, e.g. [bits: NAT][bit2: FW] [bit3: DPI][bit4: IPv6][bit5: cache data] [bit6: log] [bit7: use service xyz] . . . [bit10-12: QoS (Quality of Service) class] [bit13-14: delay tolerance level], etc.
Octets 4-6: NIC identifier
Octets 1-3 could e.g. look like: 01100000 01010100 00001100 meaning:
Identifier for our solution: 011000
U/L: 0 (global)
Multicast: 0 (no)
NAT: 0 (false)
FW: 1 (true)
DPI: 0 (false)
IPv6: 1 (true)
Cache data: 0 (false)
Log: 1 (true)
. . .
QoS class: 000
Delay tolerance level: 11
. . .

In a determine network path step 44, the routing control device determines a network path through the SDN between the first node and a second node based on the request for network properties. The network path is identified by a second address.

In one embodiment, the first node is the ARP responder and the second node is the ARP requester (of the ARP exchange mentioned above). In such a case, the first node packet (the packet including the request for network properties) is an ARP response. This embodiment corresponds to the sequence illustrated in FIG. 2A and described above.

In one embodiment, the first node is the ARP requester and the second node is the ARP responder (of the ARP exchange mentioned above). In such a case, the first node packet (the packet including the request for network properties) is an ARP request. This embodiment corresponds to the sequence illustrated in FIG. 2B and described above.

In a change source address step 46, the routing control device changes a source address of a packet to the ARP requester to be the second address.

When the first node is the ARP responder and the second node is the ARP requester, the packet to the ARP requester is the first node packet.

When the first node is the ARP requester and the second node is the ARP responder, the packet to the ARP requester is an ARP response corresponding to the ARP request.

In a configure switch(es) step 48, the routing control device configures all switches forming part of the network path, to route packets in accordance with the network path for packets comprising a destination address equal to the second address.

In a configure edge switch step 49, the routing control device configures an edge switch, being a switch closest to the ARP responder, to replace, for all packets having a destination address being equal to the second address, the destination address with an address of the ARP responder.

All addresses mentioned for the methods can be MAC addresses.

Looking now to FIG. 3B, only new or modified steps compared to the steps of FIG. 3A will be described.

In an optional receive update packet step 50, the routing control device receives an update packet originating from the first node of the SDN network. The update packet comprises an updated request for updated network properties. Also here, the request being encoded in a source address which, in this case, is the source address of the update packet.

The updated network properties allow the ARP responder 2 to adjust the requested network properties when circumstances change. For instance, certain flows may benefit from higher bandwidth after its initial setup. In this case, the first node can generate a new MAC address based on the new requirements with a format understandable for the routing control device in the update packet.

Optionally, the first node can update the requirements for inbound or outbound flows and this can be encoded in the MAC address to indicate for which direction an update of requirements are requested. This means that one bit of the MAC address is allocated for indicating of the requirements are for the inbound or outbound flow of the connection. Optionally, a second bit could be allocated for indicating if both flows should get the same requirements. The routing control device maps both flows of a connection together so it knows which outbound flow is part of the same connection as an inbound flow, to allow appropriate actions based on the requirements.

The update packet can e.g. form part of a response to a TCP data session with the second node where the source MAC address is set to its new MAC address, which has the new requirements of the first node 2. The reserved bit is used for indicating if the requirements are for the inbound or outbound flow of the TCP connection.

The routing control device maps the packet to an existing flow based on IP addresses, ports etc. and checks the source MAC address to detect the updated requirements requested by the first node.

In an optional determine updated network path step 52, the routing control device determines an updated network path through the SDN network between the first node and a second node based on the request for updated network properties. The updated network path is identified by a third address.

It should be noted here that while the first node can request any network property from the routing control device 1, the routing control device 1 is the main entity that decides about the allocation of network resources to first nodes.

In an optional configure switch(es) step 54, the routing control device configures all switches forming part of the updated network path, to route packets in accordance with the updated network path for packets comprising a destination address equal to the third address.

In an optional configure $1^{st}$ edge switch step 56, the routing control device configures an edge switch, being a switch closest to the first node, to replace, for all packets having a destination address being equal to the second address, the destination address with a destination address being the third address.

In an optional configure $2^{nd}$ edge switch step 58, the routing control device configures an edge switch, being a switch closest to the second node, to replace, for all packets having a destination address being equal to the third address, the destination address with a destination address being the address of the second node.

FIG. 4 is a flow chart illustrating methods for configuring a network path. The method is performed in a ARP responder of a SDN, such as the one shown in FIG. 1. The illustrated methods correspond to the actions of the first node illustrated in FIGS. 2A-B and described above.

In a receive $2^{nd}$ node packet step 30, the ARP responder receives a second node packet comprising an ARP request (for the ARP responder). The second node packet originates from a second node. Moreover, the second node packet forms part of an ARP exchange between an ARP requester and an ARP responder. Hence, in that exchange, the second node is the ARP requester and the second node packet is an ARP request.

In a determine desired network properties step 32, the ARP responder determines desired network properties of a network path. The network properties may comprise any one or more of: bandwidth, latency, network slice and one or more service nodes to pass.

In a generate first node packet step 34, the ARP responder generates a first node packet comprising a request for the desired network properties. The request is encoded in a first address, being a source address, of the first node packet. The first node packet is generated in response to the second node packet and the first node packet is an ARP response.

In a transmit first node packet step 36, the ARP responder transmits the first node packet.

Using embodiments presented herein, a number of improvements are achieved. Specifically, the end hosts can request their desired network properties without having direct access to network APIs or control devices of the SDN. Secondly, when the update packet decoding is supported, the end hosts can dynamically update their desired network properties. Embodiments presented herein do not need any changes in existing standards and only minimal changes are needed in some of the existing implementations. Specifically, the ARP resolution agents in the operating system of the virtual machine may need adjustments. These embodiments can be implemented in any OpenFlow-enabled SDN network. It is to be noted that not all switches of a network need to support OpenFlow, the embodiments presented herein are equally applicable for a hybrid architecture of non-OpenFlow and OpenFlow switches, as long as the edge switches support OpenFlow (or equivalent). End hosts supporting this feature can operate both in legacy networks and networks supporting this solution. The same applies for the routing control device, which can serve both legacy end hosts and solution aware end-hosts.

Figure 5:
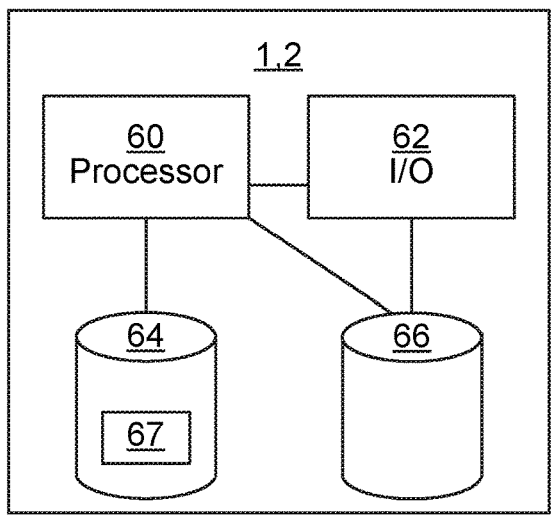
FIG. 5 is a schematic diagram illustrating components of the routing control device and the first node of FIG. 1.

FIG. 5 is a schematic diagram illustrating components of the routing control device 1 and the ARP responder 2 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described above with reference to FIG. 3A-B (for the routing control device) or FIG. 4 (for the ARP responder).

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

There is further an I/O interface 62 for communicating with external and/or internal entities.

Other components are omitted in order not to obscure the concepts presented herein.

Figure 6:
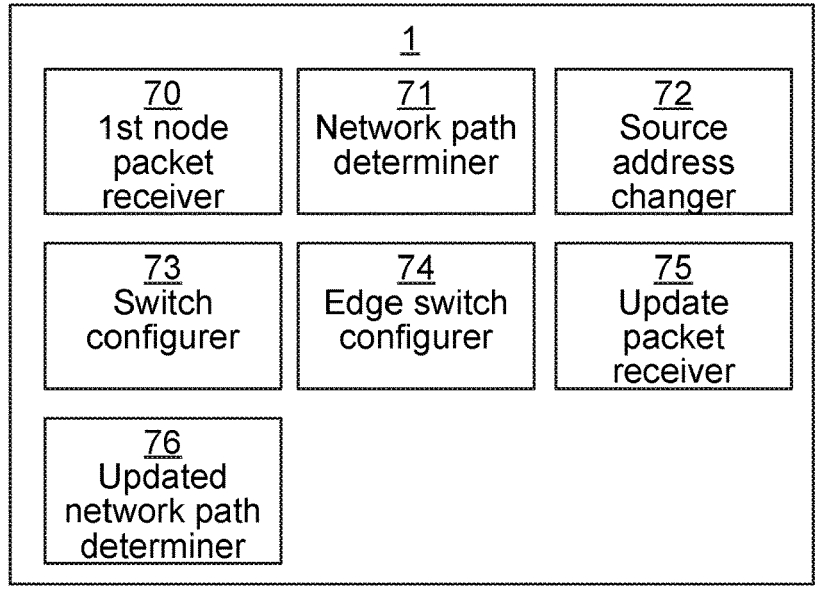
FIG. 6 is a schematic diagram showing functional modules of the routing control device of FIG. 1 according to one embodiment.

FIG. 6 is a schematic diagram showing functional modules of the routing control device 1 of FIG. 1 according to one embodiment. The modules are implemented using software instructions such as a computer program executing in the routing control device 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

1 $1^{st}$ node packet receiver 70 corresponds to step 42. A network path determiner 71 corresponds to step 44. A source address changer 72 corresponds to step 46. A switch configurer 73 corresponds to steps 48 and 54. An edge switch configurer 74 corresponds to steps 49, 56 and 58. An update packet receiver 75 corresponds to step 50. An updated network path determiner 76 corresponds to step 52.

Figure 7:
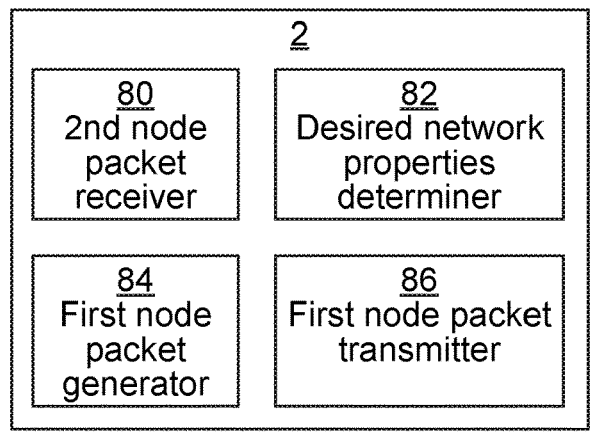
FIG. 7 is a schematic diagram showing functional modules of the first node of FIG. 1 according to one embodiment.

FIG. 7 is a schematic diagram showing functional modules of the ARP responder 2 of FIG. 1 according to one embodiment. The modules are implemented using software instructions such as a computer program executing in the ARP responder 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 4.

A $2^{nd}$ node packet receiver 80 corresponds to step 30. A desired network properties determiner 82 corresponds to step 32. A first node packet generator 84 corresponds to step 34. A first node packet transmitter 86 corresponds to step 36.

Figure 8:
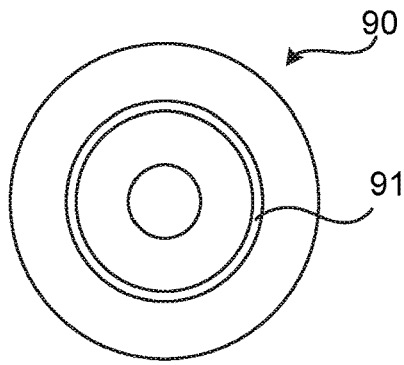
FIG. 8 shows one example of a computer program product 90 comprising computer readable means. On this computer readable means, a computer

FIG. 8 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for configuring a network path, the method being performed in a routing control device of a software defined network and comprising the steps of:
   receiving a first node packet originating from a first node of the software defined network, the first node packet forming part of an ARP, Address Resolution Protocol, exchange between an ARP requester and an ARP responder, the first node packet comprising a request for network properties, the request being encoded in a first address, being a source address, of the first node packet and the network properties comprising any two or more of: bandwidth, latency, network slice and one or more service nodes to pass;
   determining a network path through the software defined network between the first node and a second node based on the request for network properties, the network path being identified by a second address;
   changing a source address of a packet to the ARP requester to be the second address;
   configuring all switches forming part of the network path, to route packets in accordance with the network path for packets comprising a destination address equal to the second address; and
   configuring an edge switch, being a switch closest to the ARP responder, to replace, for all packets having a destination address being equal to the second address, the destination address with an address of the ARP responder.

2. The method according to claim 1, wherein all addresses are Medium Access Control, MAC, addresses.

3. The method according to claim 1, wherein the first node is the ARP responder, the second node is the ARP requester, and the first node packet is an ARP response, and in the step of changing the source address, the packet to the ARP requester is the first node packet.

4. The method according to claim 1, wherein the first node is the ARP requester, the second node is the ARP responder, and the first node packet is an ARP request, and in the step of changing the source address, the packet to the ARP requester is an ARP response corresponding to the ARP request.

5. The method according to claim 1, further comprising the steps of:
   receiving an update packet originating from the first node of the software defined network, the update packet comprising an updated request for updated network properties, the request being encoded in a source address, of the update packet;
   determining an updated network path through the software defined network between the first node and a second node based on the request for updated network properties, the updated network path being identified by a third address;
   configuring all switches forming part of the updated network path, to route packets in accordance with the updated network path for packets comprising a destination address equal to the third address;
   configuring an edge switch, being a switch closest to the first node, to replace, for all packets having a destination address being equal to be the second address, the destination address with a destination address being the third address; and
   configuring an edge switch, being a switch closest to the second node, to replace, for all packets having a destination address being equal to the third address, the destination address with a destination address being the address of the second node.

6. A routing control device for configuring a network path, the routing control device being configured to form part of a software defined network, the routing control device comprising:
   a processor; and
   a memory storing instructions that, when executed by the processor, cause the routing control device to:
      receive a first node packet originating from a first node of the software defined network, the first node packet forming part of an ARP, Address Resolution Protocol, exchange between an ARP requester and an ARP responder, the first node packet comprising a request for network properties, the request being encoded in a first address, being a source address, of the first node packet and the network properties comprising any two or more of: bandwidth, latency, network slice and one or more service nodes to pass;

determine a network path through the software defined network between the first node and a second node based on the request for network properties, the network path being identified by a second address;

change a source address of a packet to the ARP requester to be the second address;

configure all switches forming part of the network path, to route packets in accordance with the network path for packets comprising a destination address equal to the second address; and configure an edge switch, being a switch closest to the ARP responder, to replace, for all packets having a destination address being equal to the second address, the destination address with an address of the ARP responder.

7. The routing control device according to claim 6, wherein all addresses are Medium Access Control, MAC, addresses.

8. The routing control device according to claim 6, wherein the first node is the ARP responder, the second node is the ARP requester, and the first node packet is an ARP response, and the packet to the ARP requester is the first node packet.

9. The routing control device according to claim 6, wherein the first node is the ARP requester, the second node is the ARP responder, and the first node packet is an ARP request, and the packet to the ARP requester is an ARP response corresponding to the ARP request.

10. The routing control device according to claim 6, further comprising instructions that, when executed by the processor, cause the routing control device to:

receive an update packet originating from the first node of the software defined network, the update packet comprising an updated request for updated network properties, the request being encoded in a source address, of the update packet;

determine an updated network path through the software defined network between the first node and a second node based on the request for updated network properties, the updated network path being identified by a third address;

configure all switches forming part of the updated network path, to route packets in accordance with the updated network path for packets comprising a destination address equal to the third address;

configure an edge switch, being a switch closest to the first node, to replace, for all packets having a destination address being equal to the second address, the destination address with a destination address being the third address; and configure an edge switch, being a switch closest to the second node, to replace, for all packets having a destination address being equal to the third address, the destination address with a destination address being the address of the second node.

11. A method for configuring a network path, the method being performed in an ARP, Address Resolution Protocol, responder of a software defined network and comprising the steps of:

receiving a second node packet comprising an ARP request for the ARP responder, the second node packet originating from a second node and the second node packet forming part of an ARP exchange between an ARP requester and the ARP responder;

determining desired network properties of a network path, wherein the network properties comprise any two or more of: bandwidth, latency, network slice and one or more service nodes to pass;

generating a first node packet comprising a request for the desired network properties, wherein the request is encoded in a first address, being a source address, of the first node packet; and transmitting the first node packet.

12. The method according to claim 11, wherein the second node is the ARP requester.

13. An ARP, Address Resolution Protocol, responder for configuring a network path, the ARP responder being configured to form part of a software defined network, the ARP responder comprising:

a processor; and a memory storing instructions that, when executed by the processor, cause the ARP responder to:

receive a second node packet comprising an ARP request for the ARP responder, the second node packet originating from a second node and the second node packet forming part of an ARP exchange between an ARP requester and the ARP responder;

determine desired network properties of a network path, wherein the network properties comprise any two or more of: bandwidth, latency, network slice and one or more service nodes to pass;

generate a first node packet comprising a request for the desired network properties, wherein the request is encoded in a first address, being a source address, of the first node packet; and transmit the first node packet.

14. The ARP responder according to claim 13, wherein the second node is the ARP requester.

* * * * *